US009823539B2

(12) United States Patent
Casasanta, III

(10) Patent No.: US 9,823,539 B2
(45) Date of Patent: Nov. 21, 2017

(54) METHODS AND SYSTEMS FOR FORMING OPTICAL MODULATORS USING MICRO-CONTACT LITHOGRAPHY

(71) Applicant: EMPIRE TECHNOLOGY DEVELOPMENT LLC, Wilmington, DE (US)

(72) Inventor: Vincenzo Casasanta, III, Woodinville, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/901,676

(22) PCT Filed: Jun. 26, 2013

(86) PCT No.: PCT/US2013/047771
§ 371 (c)(1),
(2) Date: Dec. 28, 2015

(87) PCT Pub. No.: WO2014/209294
PCT Pub. Date: Dec. 31, 2014

(65) Prior Publication Data
US 2016/0139484 A1 May 19, 2016

(51) Int. Cl.
*G02B 6/13* (2006.01)
*G02B 6/122* (2006.01)
*G02F 1/225* (2006.01)
*G02B 6/138* (2006.01)
*G02F 1/025* (2006.01)
*G02F 1/065* (2006.01)
*G02B 6/12* (2006.01)

(52) U.S. Cl.
CPC ............ *G02F 1/225* (2013.01); *G02B 6/122* (2013.01); *G02B 6/13* (2013.01); *G02B 6/138* (2013.01); *G02F 1/025* (2013.01); *G02F 1/065* (2013.01); *G02B 2006/12069* (2013.01); *G02B 2006/12142* (2013.01); *G02F 2203/15* (2013.01)

(58) Field of Classification Search
CPC ................................. G02B 6/13; G02F 1/225
USPC ........................................................ 385/2
See application file for complete search history.

(56) References Cited

U.S. PATENT DOCUMENTS 6,052,495 A      4/2000 Little et al.
6,410,416 B1 *   6/2002 Dodabalapur ........ H01S 5/1231
                                                385/135
6,469,785 B1 *  10/2002 Duveneck ............ G01N 21/648
                                                356/244

(Continued)

OTHER PUBLICATIONS

Guo, Nanoimprint Lithography: Methods and Material Requirements, Advanced Materials, 19(4), pp. 495-513 (Feb. 2007).

(Continued)

*Primary Examiner* — Kaveh C Kianni
(74) *Attorney, Agent, or Firm* — Pepper Hamilton LLP

(57) ABSTRACT

Optical modulators, one or more components of various optical modulators, and methods of forming optical modulators and/or one or more components are disclosed. A substrate may be provided and a precursor material may be applied to the substrate with a micro-contact printing stamp. The precursor material may be cured on the substrate and the waveguide may be formed into a micro-ring resonator. The micro-contact printing stamp may be configured to create a waveguide on the substrate.

16 Claims, 5 Drawing Sheets

(56) References Cited

U.S. PATENT DOCUMENTS

| | | | |
|---|---|---|---|
| 6,776,094 B1* | 8/2004 | Whitesides | B01L 3/5085 |
| | | | 101/327 |
| 6,876,796 B2 | 4/2005 | Garito et al. | |
| 6,937,804 B2 | 8/2005 | McCoy et al. | |
| 7,008,556 B2 | 3/2006 | Casasanta, III et al. | |
| 7,557,367 B2* | 7/2009 | Rogers | B82Y 10/00 |
| | | | 257/40 |
| 8,217,381 B2* | 7/2012 | Rogers | H01L 21/8258 |
| | | | 257/40 |
| 9,352,963 B2* | 5/2016 | Wang | B82B 3/00 |
| | | | 356/402 |
| 2001/0004411 A1 | 6/2001 | Yariv | |
| 2003/0186522 A1* | 10/2003 | Duan | B81C 99/008 |
| | | | 438/584 |
| 2005/0016217 A1* | 1/2005 | Takakuwa | B82Y 10/00 |
| | | | 65/386 |
| 2005/0180680 A1* | 8/2005 | Kong | B29C 43/003 |
| | | | 385/14 |
| 2006/0114960 A1 | 6/2006 | Snee et al. | |
| 2007/0223859 A1* | 9/2007 | Kornilovich | G09F 9/00 |
| | | | 385/15 |
| 2013/0082376 A1 | 4/2013 | Nagarkar et al. | |
| 2014/0226160 A1* | 8/2014 | Mappes | H01S 3/08059 |
| | | | 356/402 |

OTHER PUBLICATIONS

International Search Report and Written Opinion for International Application No. PCT/US13/47771 dated Nov. 26, 2013.

Rezzonico et al., Electro-optic Charon polymeric microring modulators, 16(2), pp. 613-627 (Jan. 8, 2008).

Wang et al., All-polymer Microring Resonator Fabricated by UV Imprint Technique, Proceedings Symposium IEEE Photonics lk nelux, pp. 101-104 (2010).

* cited by examiner

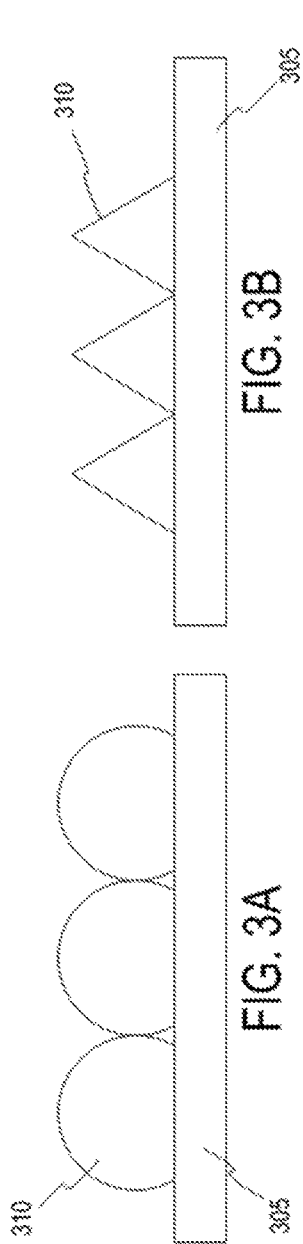
FIG. 3A
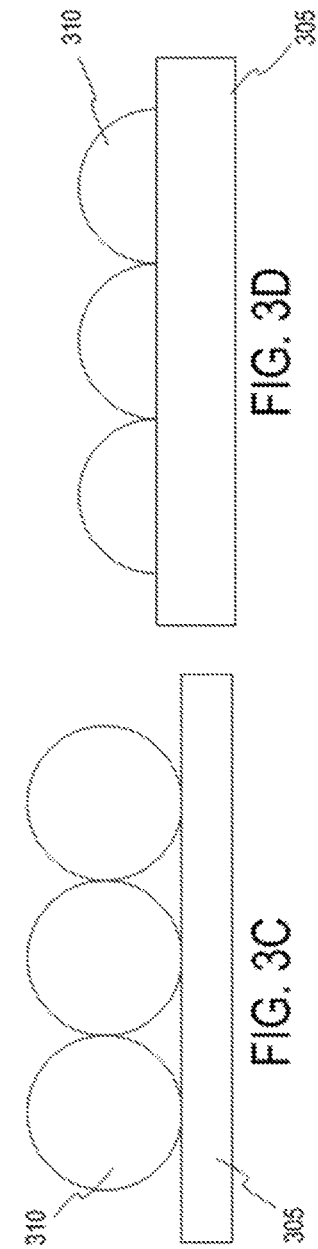
FIG. 3C
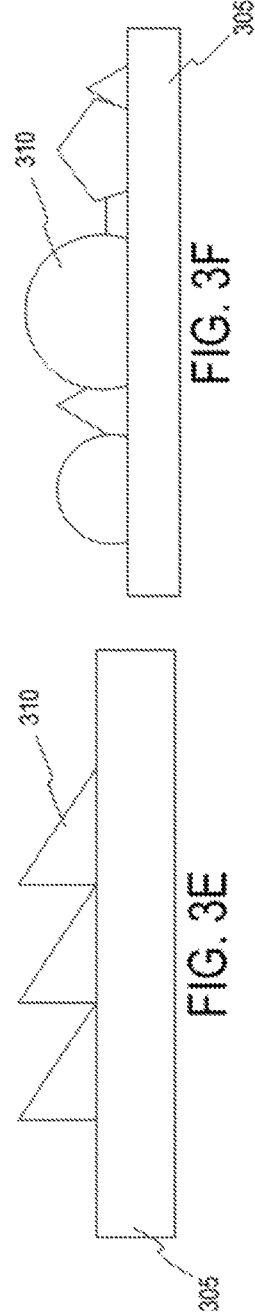
FIG. 3E
FIG. 3B
FIG. 3D
FIG. 3F

METHODS AND SYSTEMS FOR FORMING OPTICAL MODULATORS USING MICRO-CONTACT LITHOGRAPHY

CROSS-REFERENCE TO RELATED APPLICATION

This application is a U.S. National Stage filing under 35 U.S.C. §371 of International Application No. PCT/US2013/047771, filed on Jun. 26, 2013 and entitled "METHODS AND SYSTEMS FOR FORMING OPTICAL MODULATORS USING MICRO-CONTACT LITHOGRAPHY," which is incorporated herein by reference in its entirety.

BACKGROUND

Optical modulators have enjoyed widespread use due to their ability to quickly and efficiently isolate a particular wavelength from an electromagnetic signal and direct the isolated signal where necessary. However, current methods of manufacturing optical modulators are costly and such modulators are difficult to construct to a desired size, shape, composition, and cross sectional shape. These drawbacks are amplified in systems where a large number of optical modulators are desired, such as, for example, systems in which a large number of different wavelengths are desired to be isolated and directed.

SUMMARY

In an embodiment, a method of forming an optical modulator may include providing a flexible substrate, applying a precursor material to the flexible substrate with a micro-contact printing stamp, curing the precursor material on the flexible substrate, and forming the waveguide into a micro-ring resonator. The micro-contact printing stamp may be configured to create a waveguide on the flexible substrate.

In an embodiment, an optical modulator formed from micro-contact printing may include a micro-ring resonator having at least a waveguide. The waveguide may include a flexible substrate and a precursor material applied to the flexible substrate. The waveguide may be formed by pressing the precursor material onto the substrate via a micro-contact printing stamp.

BRIEF DESCRIPTION OF THE DRAWINGS

FIGS. 3A-3F depict optical modulators having various alternative cross-sectional shapes according to a plurality of embodiments.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

"Optical" or "photonic" switches allow selective transmission of electromagnetic signals. A photonic switch refers to any optical coupling or element having a source or input signal, an output or drain signal, and a third gate signal that affects the relationship between the source and drain signals. An illustrative example of a photonic switch includes an optical modulator.

A "source waveguide" is a waveguide that generally provides a source of electromagnetic radiation to one or more micro-ring resonators, as described in greater detail herein. Those skilled in the art will recognize that the source waveguide can be any waveguide of any material and dimensions, particularly those capable of carrying an input of electromagnetic radiation.

A "drain waveguide" is a waveguide that generally provides a means of outputting electromagnetic radiation from one or more micro-ring resonators, as described in greater detail herein. Those skilled in the art will recognize that the drain waveguide can be any waveguide of any material and dimensions, particularly those capable of carrying an output of electromagnetic radiation.

A "micro-ring resonator" is a waveguide that is generally arranged in a ring-like configuration. The micro-ring resonator can isolate one or more wavelengths from a plurality of wavelengths in an electromagnetic radiation signal, as described in greater detail herein. In various embodiments, the micro-ring resonators described herein may generally be optically connected to one or more source waveguides to receive an electromagnetic radiation signal. Similarly, the micro-ring resonators described herein may generally be optically connected to one or more drain waveguides configured to carry an electromagnetic radiation signal out of the micro-ring resonator. The micro-ring resonator can include, for example, a substrate, a waveguide material, a cladding, and a core, as described in greater detail herein.

Figure 1A:
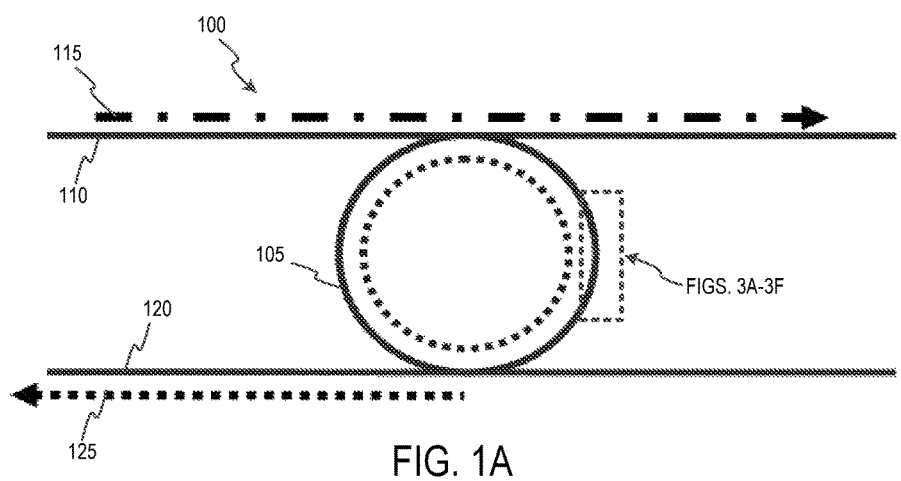
FIG. 1A depicts an illustrative optical modulator according to a first embodiment.

FIG. 1A depicts an illustrative optical modulator, generally designated 100, according to an embodiment. The optical modulator described herein may be configured as a component of a microelectronic chip, such as, for example, a MEMS optical modulator or the like. In various embodiments, the optical modulator 100 may generally contain a micro-ring resonator 105, a source waveguide 110, and a drain waveguide 120. Those skilled in the art will recognize that the configuration of the optical modulator 100 is not limited by this disclosure, and may include any number of micro-ring resonators 105, source waveguides 110, and drain waveguides 120 arranged in any number of manners as may be required for specific uses of the optical modulator, as described in greater detail herein.

In various embodiments, the optical modulator 100 may be configured so that the micro-ring resonator 105 receives a first signal 115 via the source waveguide 110, such as, for example, an input signal. In some embodiments, the first signal 115 may generally contain any form of electromagnetic radiation, including, but not limited to, radio waves, microwaves, infrared light waves, visible light waves, ultraviolet light waves, x-ray waves, and/or gamma ray waves. Accordingly, the first signal 115 may further contain electromagnetic radiation that is transmitted on one or more wavelengths. Each wavelength may be capable of carrying one or more streams of data, as described in greater detail herein.

In various embodiments, the source waveguide 110, the drain waveguide 120, and the micro-ring resonator 105 may be patterned together at the same time in a monolithic manner when constructed, as described in greater detail herein. Thus, according to some embodiments, the structure of the optical modulator 100 may contain one or more continuous optical paths between all three portions (source waveguide 110, drain waveguide 120, and micro-ring resonator 105) of the optical modulator.

In various embodiments, the micro-ring resonator 105 may be coupled at a coupling length to the source waveguide 110 and/or the drain waveguide 120. In some embodiments, the coupling length may be about 10 μm to about 200 μm. In particular embodiments, the coupling length may be about 10 μm, about 20 μm, about 25 μm, about 50 μm, about 75 μm, about 100 μm, about 125 μm, about 150 μm, about 175 μm, about 200 μm, or any value or range between any two of these values.

In various embodiments, the optical modulator 100 may be configured to isolate one or more wavelengths from the first signal 115. In some embodiments, this may be achieved when electromagnetic radiation traveling in the source waveguide 110 having a wavelength that is a divisor of an optical path length L, is coupled to the micro-ring and forms a standing wave pattern in the micro-ring resonator 105. Thus, the wavelength is on-resonance with the micro-ring in accordance with Equation 1:

$$\lambda_{resonant}^{(m)} = \left(\frac{L}{m}\right) n_{eff} \qquad (1)$$

where $\lambda_{resonant}^{(m)}$ is a resonant wavelength, L is the length of the optical path, m is an integer, and $n_{eff}$ is the effective index. Thus, in some embodiments, radiation having a substantially different wavelength than the resonant wavelength may not be directed into the micro-ring resonator 105 (to a first approximation) and may continue to travel in the source waveguide 110 without being coupled into the micro-ring resonator.

In various embodiments, the optical modulator 100 may be configured to direct the isolated wavelength, once isolated from the first signal 115 by the micro-ring resonator 105, into the drain waveguide 120 as a second signal 125. In some embodiments, the drain waveguide 120 may be configured to reflect and/or redirect the second signal 125. The second signal 125 may generally be redirected to a device or apparatus that is optically connected to the drain waveguide 120 and further configured to receive the second signal.

Figure 1B:
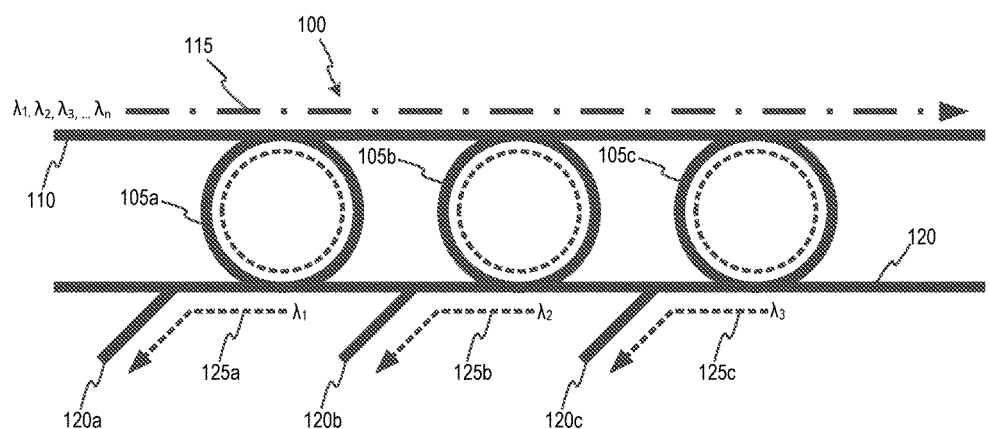
FIG. 1B depicts an illustrative optical modulator according to a second embodiment.

In some embodiments, it may be desirable to isolate a plurality of wavelengths from the first signal 115. Because a single micro-ring resonator 105 may be configured to only isolate a single wavelength according to some embodiments, it may be necessary to incorporate an optical modulator 100 with a plurality of micro-ring resonators 105a, 105b, 105c as depicted in FIG. 1B. Each of the plurality of micro-ring resonators 105a, 105b, 105c may be configured to isolate a wavelength that is different from the other micro-ring resonators by having varying resonant wavelengths. Thus, according to some embodiments, a first micro-ring resonator 105a may be configured to isolate a first wavelength $\lambda_1$, a second micro-ring resonator 105b may be configured to isolate a second wavelength $\lambda_2$, and a third micro-ring resonator 105c may be configured to isolate a third wavelength $\lambda_3$. While three micro-ring resonators are used herein, those skilled in the art will recognize that this number is merely illustrative, and that an optical modulator 100 as described herein may contain greater or fewer micro-ring resonators in accordance with the number of wavelengths to be isolated from the first signal 115. For example, the number of micro-ring resonators can be 1, 2, 3, 4, 5, 6, 7, 8, 9, 10, 11, 12, 13, 14, 15, 16, 17, 18, 19, 20, 25, 30, 35, 40, 50, and so on. In a particular embodiment, the optical modulator 100 may incorporate 20 micro-ring resonators. In particular embodiments, the optical modulator 100 may be configured so that the various micro-ring resonators 105a, 105b, 105c function as a series of logic gates, such as NOT, AND, NAND, OR, or NOR gates.

In an embodiment having a plurality of micro-ring resonators 105a, 105b, 105c, each micro-ring resonator may have a corresponding drain waveguide portion 120a, 120b, 120c of the drain waveguide 120. In some embodiments, each drain waveguide portion 120a, 120b, 120c may direct the isolated wavelength from its corresponding micro-ring resonator 105a, 105b, 105c accordingly, as described in greater detail herein. Each drain waveguide portion 120a, 120b, 120c may further be optically connected to another device or apparatus that is configured to receive a second signal 125a, 125b, 125c, as described in greater detail herein.

In various embodiments, an internal radius of each micro-ring resonator 105 may be selected based upon a desired resonant wavelength and thus a wavelength to be isolated by the micro-ring resonator. The desired wavelength may generally be a wavelength carrying a desired signal. The desired wavelength may be calculated using Equation 2:

$$m\lambda = 2\pi nR \qquad (2)$$

where λ is the wavelength to be selected, m is the propagation mode number, n is the index of refraction of the core, and R is the internal radius of the ring. In some embodiments, each micro-ring resonator 105 may have an internal radius of about 5 μm to about 1000 μm. In particular embodiments, each micro-ring resonator 105 may have an internal radius of about 5 μm, about 10 μm, about 15 μm, about 25 μm, about 50 μm, about 75 μm, about 100 μm, about 150 μm, about 200 μm, about 250 μm, about 300 μm, about 400 μm, about 500 μm, about 750 μm, about 1000 μm, or any value or range between any two of these values.

In various embodiments, at least a portion of the optical modulator 100, including, but not limited to, the micro-ring resonator 105, the source waveguide 110, and the drain waveguide 120, may each contain a substrate material. In some embodiments, the substrate material may be a flexible substrate material. In other embodiments, the substrate material may be a rigid substrate material. In some embodiments, the substrate material may be silicon, quartz, diamond, GaAs, ZnS, Ge, SiGe, GaInP, InP, AlGaAs, GaInAs, AlInGaP, GaAsN, GaN, GaInN, InN, GaInAlN, GaAlSb, GaInAlSb, CdTe, MgSe, MgS, 6HSiC, ZnTe, GaAsSb, GaSb, InAsN, 4H-SiC, a-Sn, BN, BP, BAs, AlN, ZnO, ZnSe, CdSe, CdTe, HgS, HgSe, PbS, PbSe, PbTe, HgTe, HgCdTe, CdS, ZnSe, InSb, AlP, AlAs, AlSb, InAs, AlSb, and/or a combination thereof.

In various embodiments, at least a portion of the optical modulator 100, including, but not limited to, the source waveguide 110, the micro-ring resonator 105, and the drain waveguide 120 may each be constructed of at least one precursor material. In some embodiments, the precursor material may be used to form a core and/or a cladding, as described in greater detail herein. In some embodiments, the precursor material may be initially stored in a bath or the like, in a liquid or a substantially viscous form, so as to allow a stamp to be coated in the precursor material when the stamp is placed into the bath and then subsequently applied to a substrate, as described in greater detail herein. In some embodiments, the precursor material may be cured so that it hardens subsequent to placement on the substrate to form the waveguide, as described in greater detail herein.

In some embodiments, the precursor material may include a semiconductor, such as, for example, a semiconductor portion. The semiconductor portion may be configured to generate electromagnetic radiation. Illustrative examples of the semiconductor portion may include one or more of silicon, germanium, silicon-germanium, a group III-V semiconductor, and a group II-VI semiconductor. Examples of group III-V semiconductors may include, but are not limited to, AlSb, AlAs, AlN, AlP, BN, BP, BAs, $B_{12}As_2$, GaSb, GaAs, GaN, GaP, InSb, InAs, InN, InP, AlGaAs, InGaAs, InGaP, AlInAs, AlInSb, GaAsN, GaAsP, GaAsSb, AlGaN, AlGaP, InGaN, InAsSb, InGaSb, AlGaInP, AlGaAsP, InGaAsP, InGaAsSb, InAsSbP, AlInAsP, AlGaAsN, InGaAsN, InAlAsN, GaAsSbN, GaInNAsSb, and GaInAsSbP. Examples of group II-VI semiconductors may include, but are not limited to, CdSe, CdS, CdTe, ZnO, ZnSe, ZnS, ZnTe, CdZnTe, HgCdTe, HgZnTe, and HgZnSe.

In some embodiments, the precursor material may include a light outcoupling portion. The light outcoupling portion may generally provide a reduction of an outcoupling loss to improve propagation of electromagnetic radiation through the source waveguide 110, the micro-ring resonator 105 and/or the drain waveguide 120. In some embodiments, the light outcoupling portion may include at least one organic substance. In particular embodiments, the light outcoupling portion may include, based on the overall weight of the portion, a percentage of at least one of the organic substances. The percentage may be at least about 20% by weight, at least about 30% by weight, at least about 40% by weight, at least about 50% by weight, at least about 60% by weight, at least about 70% by weight, at least about 80% by weight, or any value or range between any two of these values. In some embodiments, the light outcoupling portion a include about 1 to about 10 organic substances. In particular embodiments, the light outcoupling portion may include about 1 organic substance, about 2 organic substances, about 3 organic substances, about 4 organic substances, about 5 organic substances, about 6 organic substances, about 7 organic substances, about 8 organic substances, about 9 organic substances, or about 10 organic substances. The organic substance may be selected from one or more aryl compounds, perfluorinated adamantine, triphenylamine compounds, carbazole compounds, oxadiazole compounds, triazole compounds, triazine compounds, fluorene compounds, hexaphenylbenzene compounds, phenanthroline compounds, pyridine compounds, polyfluorene with perfluorinated side chains, conjugated polymers, poly-paraphenylene vinylene (PPV), polyvinylcarbazole, metal complexes, metal complexes having Al, Ga and/or Zn as a metal ion, quinoline compounds, acetylacetonate compounds, bipyridine compounds, phenathroline compounds, and/or metal complexes having carboxylic acids as a ligand. The organic substance may be a monomer, an oligomer, or a polymer.

In some embodiments, the precursor material may include one or more of a sol-gel material, a hydrocarbon polymer, a fluorinated polymer, a silicon containing polymer, and/or the like. Illustrative examples of hydrocarbon polymers may include, but are not limited to, polyolefins, polydienes, and/or polystyrene. Illustrative examples of polyolefins may include, but are not limited to, polyethylene, polypropylene, poly(1-butene), poly(4-methyl-1-pentene), and blends, mixtures, and copolymers thereof. Illustrative examples of fluorinated polymers may include polytetrafluoroethylene (PTFE), perfluoroalkylvinyl ether (PFA), fluorinated ethylene-propylene copolymer (FEP), ethylene tetrafluoroethylene copolymer (ETFE), polyvinylidene fluoride (PVDF), polychlorotrifluoroethylene (PCTFE), and/or tetrafluoroethylene Illustrative examples of silicon containing polymers may include, but are not limited to, silicates, siloxanes such as hydrogen silsesquioxane (HSQ), hexamethyldisiloxane, octamethyltrisiloxane, and the like, silazanes such as polysilazanes, hexamethyldisilazane (HMDS), tetramethyldisilazane, octamethylcyclotetrasilazine, hexamethylcyclotrisilazine, diethylaminotrimethylsilane, dimethylaminotrimethylsilane, and the like, and silisesquioxanes such as hydrogen silsesquioxane (HSQ).

In some embodiments, the precursor material may include one or more of a polymer host material, a sol-gel host material, an active nanoparticle, a passive nanoparticle, a nanophase material, and/or the like. In some embodiments, the active nanoparticles and/or the passive nanoparticles may be, but are not limited to, metal nanoparticles and/or semiconductor nanoparticles. In some embodiments, the active nanoparticles and/or the passive nanoparticles may have an average size of about 1 nm to about 200 nm. In particular embodiments, the active nanoparticles and/or the passive nanoparticles may have an average size of about 1 nm, about 5 nm, about 10 nm, about 25 nm, about 50 nm, about 75 nm, about 100 nm, about 125 nm, about 150 nm, about 175 nm, about 200 nm, or any value or range between any two of these values. In some embodiments, the nanophase material may have an average size of about 1 nm to about 200 nm. In particular embodiments, the nanophase material may have an average size of about 1 nm, about 5 non, about 10 nm, about 25 nm, about 50 nm, about 75 nm, about 100 nm, about 125 nm, about 150 nm, about 175 nm, about 200 nm, or any value or range between any two of these values. In some embodiments, the nanoparticles may form a homogenous composite with the cured sol-gel materials.

In some embodiments, the precursor material may contain one or more thermal curing agents and/or one or more optical curing agents. Examples of thermal curing agents may include, but are not limited to, imidazoles, primary, secondary, and tertiary amines, quaternary ammonium salts, anhydrides, polysulfides, poly mercaptans, phenols, carboxylic acids, polyamides, quaternary phosphonium salts, and combinations thereof. Illustrative examples of optical curing agents may include, but are not limited to, benzophenones, acetophenones, and cationic photoinitiators.

Figure 2:
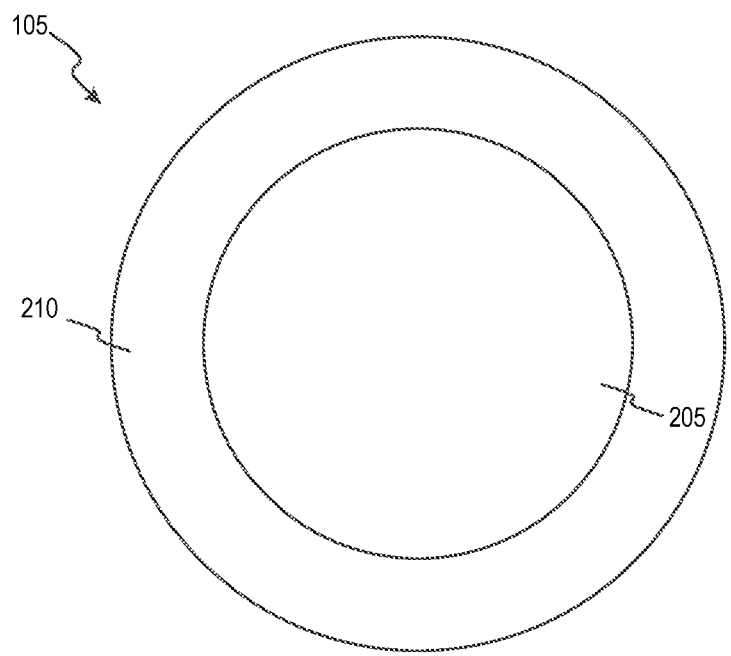
FIG. 2 depicts a detailed view of a micro-ring resonator according to an embodiment.

FIG. 2 depicts a detailed view of the micro-ring resonator according to an embodiment. In various embodiments, the micro-ring resonator 105 may include a core 205 and/or a cladding 210. The cladding 210 may generally have one or more layers of material surrounding the core 205 and may generally have a lower refractive index than the core. In some embodiments, the cladding 210 may contain a refractive index that is about 1% to about 85% of the refractive index of the core 205. In particular embodiments, the cladding 210 may have a refractive index that is about 1%, about 5%, about 10%, about 25%, about 33%, about 50%, about 67%, about 75%, about 85% or any value or range between any of these two values, of the refractive index of the core 205. In some embodiments, the radius of the core 205 to the outer radius of the cladding 210 may have a ratio of about 1:1 to about 100:1. In particular embodiments, the radius of the core 205 to the outer radius of the cladding 210 may have a ratio of about 1:1, about 2:1, about 5:1, about 10:1, about 25:1, about 50:1, about 100:1, or any range or value between any two of these values.

In various embodiments, the core 205 may be comprised of a contrast material having a high refractive index. In some embodiments, the core 205 may include a contrast material with a refractive index of about 1.4 to about 1.5. The contrast material is not limited by this disclosure, and may include any materials now known or later developed that are recognized as suitable for the core 205, including materials previously described herein. Illustrative examples of contrast materials for the core 205 may include glass, polystyrene, polycarbonate, polyphenyl methacrylate, polycyclohexyl methacrylate, poly-3,3,5-trimethylcyclohexyl methacrylate, polyphenyl-a-fluoromethacrylate, and the like. In some embodiments, the core 205 may have a radius of about 1 µm to about 500 µm. In particular embodiments, the core 205 may have a radius of about 1 µm, about 5 µm, about 10 µm, about 20 µm, about 25 µm, about 50 µm, about 75 µm, about 100 µm, about 200 µm, about 250 µm, about 300 µm, about 400 µm, about 500 µm, or any range or value between any two of these values.

In various embodiments, the one or more layers of cladding 210 may generally be comprised of a low-index contrast material. Any type of material commonly known or later developed for cladding may be used, including, for example, a fluid, a polymer, and the like. In some embodiments, the cladding 210 may further include a cladding dopant that renders the refractive index of the cladding material photosensitive at least within a given wavelength range. In some embodiments, the cladding 210 may have an outer radius of about 10 µm to about 1000 µm. In particular embodiments, the cladding 210 may have an outer radius of about 10 µm, about 20 µm, about 25 µm, about 50 µm, about 75 µm, about 100 µm, about 200 µm, about 250 µm, about 300 µm, about 400 µm, about 500 µm, about 750 µm, about 1000 µm, or any range or value between any two of these values. In some embodiments, the one or more layers of cladding 210 may be placed on the substrate prior to placement of the precursor material, as described herein.

Specific examples of materials used for the core 205 and the cladding 210 may include Dow Corning® OE-4140 (Dow Corning, Midland, Mich.), a UV-cured polysiloxane elastomer that may serve as an optical core for a waveguide and Dow Corning® OE-4141 (Dow Corning, Midland, Mich.), a UV-cured polysiloxane elastomer that may serve as an optical cladding. Such materials may demonstrate propagation losses of less than 0.05 dB/cm at 850 nm, with minimal changes in optical loss upon exposure to 85% RH/85° C. conditions over 1000 hours and solder reflow cycles, thereby allowing the core 205 and the cladding 210 to be suitable for conventional electronic packaging processes. Other specific examples of materials used for the core 205 and the cladding 210 may include Truemode™ EMX-TMW-CORE material (Exxelis, Edinburgh, UK), which has an index of 1.57 and a loss of 0.04 dB/cm at 850 nm and their Truemode™ EMX-TMW-CLAD material (Exxelis, Edinburgh, UK), which has an index of 1.5.

In various embodiments, various portions of the waveguides (source waveguide 110, micro-ring resonator 105, and drain waveguide 120) in the optical modulator 100 (FIG. 1) may have entry and exit optics and/or optical surfaces disposed onto the waveguides configured in such a manner as to reflect and/or absorb electromagnetic radiation. In some embodiments, these optical elements will be in optical communication with the waveguides such that they may reflect and/or absorb electromagnetic radiation based upon a specific wavelength spectrum and angle of incidence or exit. In some embodiments, the waveguides may reflect and/or absorb electromagnetic radiation based upon an angle at which the electromagnetic radiation is incident on the optical element and waveguide ensemble.

FIGS. 3A-3F depict illustrative cross sectional shapes of each waveguide 310 according to various embodiments. The cross sectional shapes shown in FIGS. 3A-3F are merely illustrative. Accordingly, those skilled in the art will recognize other shapes will be possible without departing from the scope of the present disclosure. Each waveguide 310 may have, for example, a truncated circular shape (FIG. 3A), a circular shape (FIG. 3C), a semicircular shape (FIG. 3D), a triangular shape (FIGS. 3B and 3E), and/or a series of regular and/or irregular shapes (FIG. 3F).

In various embodiments, the waveguide 310 may be placed on a substrate 305, as described in greater detail herein. In some embodiments, the substrate 305 may be a flexible substrate. In other embodiments, the substrate 305 may be a rigid or semi-rigid substrate. In some embodiments, the substrate 305 may be one or more of silicon, quartz, diamond, GaAs, ZnS, Ge, SiGe, GaInP, InP, AlGaAs, GaInAs, AlInGaP, GaAsN, GaN, GaInN, InN, GaInAlN, GaAlSb, GaInAlSb, CdTe, MgSe, MgS, 6HSiC, ZnTe, GaAsSb, GaSb, InAsN, 4H-SiC, a-Sn, BN, BP, BAs, AlN, ZnO, ZnSe, CdSe, CdTe, HgS, HgSe, PbS, PbSe, PbTe, HgTe, HgCdTe, CdS, ZnSe, InSb, AlP, AlAs, AlSb, InAs, AlSb, and/or the like, as previously described herein.

Figure 4:
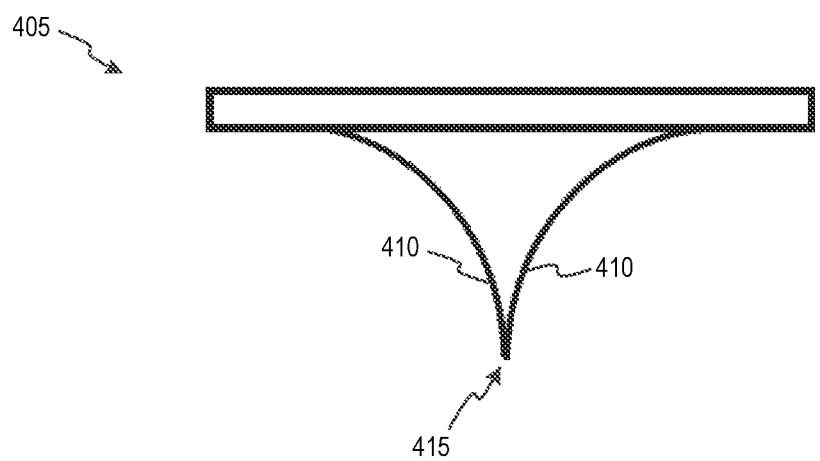
FIG. 4 depicts an illustrative micro contact printing stamp that may be used to form an optical modulator according to an embodiment.

FIG. 4 depicts a cross-sectional view of an illustrative stamp used for forming a waveguide 310 on a substrate, such as 305 (FIGS. 3A-3F), according to an embodiment. The stamp 405 may generally be any shape or size that can be placed, for example, into a precursor material bath and applied to a substrate, as described in greater detail herein. Furthermore, the stamp 405 may be shaped in such a manner so that when it is pressed against the substrate and subsequently removed, a bead of precursor material will remain on the substrate in a specific shape and/or a specific size, such as the shapes described herein. In some embodiments, the stamp 405 may be formed with respect to the viscosity of the precursor material, so that a particular shape of the stamp will produce a desired precursor material shape on the substrate because of the tendency of the precursor material to resist deformation once it is placed on the substrate. In an illustrative example, the stamp 405 may be a generally triangular shape with a plurality of generally curved concave sides 410 that result in an application tip 415, as shown in FIG. 4. As a result of pressing the application tip 415 portion of the stamp 405 upon a substrate material, the precursor material will form a substantially truncated circular, a substantially circular, or a substantially hemispherical shape of precursor material upon the substrate. However, other shapes and sizes that result in other application tips or application surfaces will be evident to those skilled in the art without departing from the scope of this disclosure. Thus, in some embodiments, the shape of the precursor material may be manipulated by the stamp 405 based on the size and shape of the stamp and/or the size, shape, and positioning of the application tip 415 on an application surface.

In various embodiments, the stamp 405 may be formed by molding an elastomeric or plastic material (such as a silicone-based material) into a fixed mold, which is subsequently cured or crosslinked. In some embodiments, the mold may be formed and constructed out of a metallic material by various micromachining methods, such as, for example, electrochemical discharge machining, wet chemical etching, or dry plasma etching methods.

Figure 5:
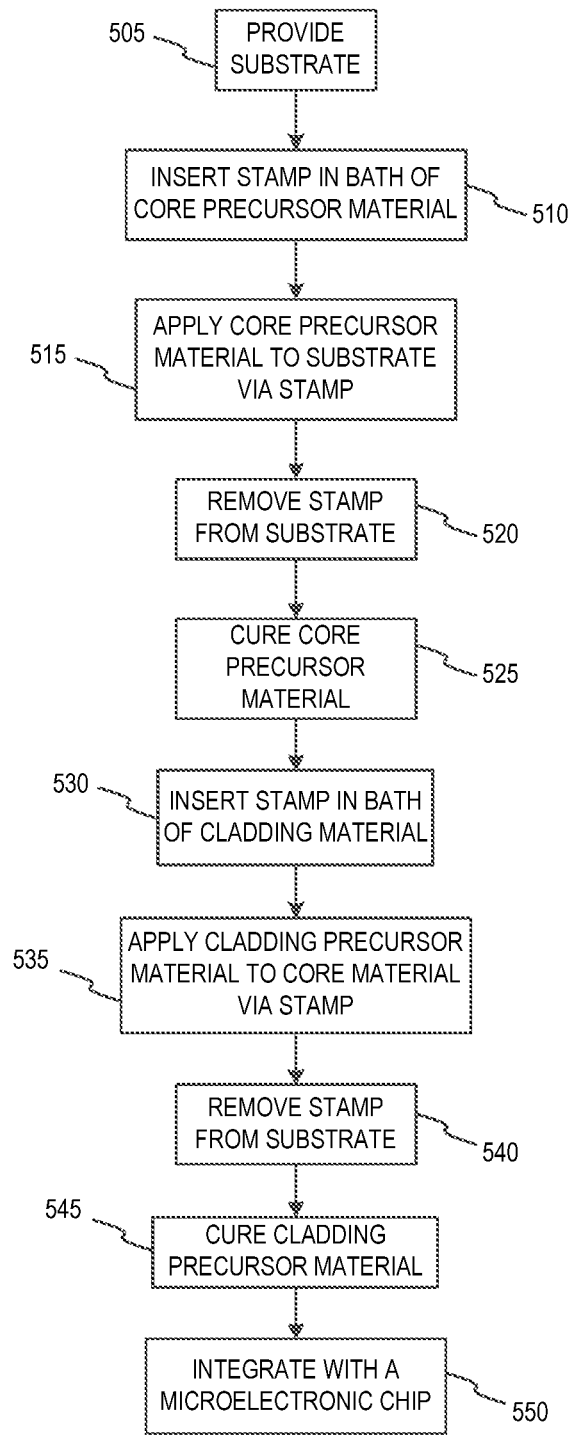
FIG. 5 depicts a flow diagram of an illustrative method of forming an optical modulator according to an embodiment.

FIG. 5 depicts a flow diagram of an illustrative method of forming an optical modulator according to an embodiment. The method described in FIG. 5 may be completed by any number of processes as described herein. In various embodiments, a substrate may be provided 505. As previously described herein, the substrate may act as a base material for the waveguide, and may be flexible or rigid.

In various embodiments, a stamp may be inserted 510 into a bath of precursor material. In some embodiments, the precursor material may generally contain precursor material used for the core, as described in greater detail herein. In other embodiments, the precursor material may generally contain precursor material used for the cladding, as shown in process 530 and described in greater detail herein. In some embodiments, the precursor material bath may generally contain precursor material that is fluid or viscous to allow the precursor material to coat at least a portion of the stamp, such as the application tip, as described herein. In certain embodiments, the stamp may be inserted 510 (or 530) for a period of time to sufficiently coat the stamp with the precursor material. In some embodiments, the stamp may be inserted 510 (or 530) to transfer a particular amount of precursor material from the bath to the stamp. The particular amount may generally be an amount that is sufficient to form a bead of precursor material having desired shape and on the substrate, as described in greater detail herein.

In some embodiments, the stamp may be removed from the bath of precursor material in such a manner that the precursor material remains on at least a portion of the stamp. In various embodiments, at least a portion of the precursor material may be applied 515 to a substrate via the stamp. In some embodiments, the precursor material may be applied 515 to the substrate by contacting the stamp with the substrate. For example, the stamp may be pressed to the substrate at a particular pressure and for a particular period of time. In other embodiments, the precursor material may be applied 515 to the substrate by placing the stamp in close proximity to the substrate and allowing the precursor material to transfer from the stamp to the substrate. Allowing the precursor material to transfer from the stamp to the substrate may include allowing a force, such as a gravitational force, a cohesive force, an adhesive force, a viscous force, and/or the like to cause the precursor material to transfer to the substrate. In some embodiments, applying 515 the stamp may ensure a particular amount of precursor material is transferred from the stamp to the substrate. The particular amount may generally be an amount that is sufficient to form a bead of precursor material on the substrate having a desired shape and size, as described in greater detail herein. In some embodiments, the particular amount may further be an amount that is sufficient to form a bead of core material on the substrate. In other embodiments, the particular amount may be an amount that is sufficient to form a bead of cladding material on the substrate (as is shown in process 535). Thus, by forming a desired shape and size bead, the core and/or the cladding portion of the source waveguide, the drain waveguide, and the micro-ring resonator will be formed at a desired size and shape upon curing of the precursor material, as described in greater detail herein.

In various embodiments, the stamp may be removed 520 (or 540) from the substrate or from the proximity of the substrate. In some embodiments, the removal 520 (or 540) may generally occur after at least a portion of the precursor material has been transferred to the substrate, as previously described herein. In some embodiments, the removal 520 (or 540) may contribute in forming the shape of the precursor material on the substrate. For example, the stamp may be removed 520 (or 540) at a particular angle or with a particular motion to ensure a properly sized and/or shaped precursor material upon the substrate. In some embodiments, once the stamp has been removed 520 (or 540), it may be discarded or subsequently used to apply precursor material to another substrate or a different portion of the same substrate.

In some embodiments, the stamp, precursor bath, and substrate may be arranged and configured in such a manner that the stamp continuously moves between the bath and various portions of the substrate to continuously apply precursor material to areas of the substrate that do not contain precursor material thereon or are in need of additional precursor material thereon. The structure and method of such an application process is not limited by this disclosure and may include any structure or method now known or later developed.

In various embodiments, the precursor material and/or the substrate may be cured 525 (or 545). As used herein, curing 525 (or 545) refers to physical or chemical hardening or solidifying by any method, such as heating, cooling, drying, crystallization, chemically reacting, or applying radiation. In the cured state, all or a portion of the components in the precursor material formulation may be cross-linked, thereby forming covalent linkages between all or a portion of the components. In addition, in the cured state, all or a portion of the components may be chemically bonded by one or more of interactions, such as, for example, ionic bonding, covalent bonding, van der Waals bonding, or hydrogen bonding. In some embodiments, the precursor material and the substrate may be cured 525 (or 545) to permanently affix the precursor material onto the substrate and/or to permanently maintain the shape and/or size of the bead of precursor material on the substrate.

In some embodiments, curing 525 (or 545) may be effected by thermally curing the precursor material. Thermally curing, or photonic curing of, the precursor material may include processing the precursor material at a high temperature using a pulsed light. In some embodiments, the processing may use a flashtube, a flashlamp, an ultraviolet lamp (UV) or an electric arc lamp that is configured to produce a high intensity, incoherent, full-spectrum white light or UV light for a short period of time.

In some embodiments, curing 525 (or 545) may be effected by photoinitiated curing. The photoinitiated curing 525 (or 545) may be completed via either thermal decomposition or photo decomposition. Photoinitiation may require the use of one or more photopolymerization initiators. Examples of photopolymerization initiators may include, but are not limited to, benzoin, benzoin methyl ether, benzoin ethyl ether, benzoin isopropyl ether, benzoin-n-butyl ether, benzoin isobutyl ether, acetophenone, dimethylacetophenone, 2,2-dimethoxy-2-phenylacetophenone (DMPA), 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino propane-1-one, 4-(2-hydroxyethoxy)phenyl-2-hydroxy-2-propylketone, benzophenone, p-phenylbenzophenone, 4,4-diethylamino benzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-isopropylthioxanthone, 2-chlorothioxanthone, 2,4-dimethylthioxanthone, 2,4-diethylthioxanthone, benzyl dimethyl ketal, acetophenone dimethyl ketal, 2,4,6-trimethyl benzoyldiphenyl phosphine oxide, 6-trimethyl benzoyl diphenylphosphine oxide, 2-benzyl-2-dimethylamino-1-(4-morpholinophenyl)-butan-1-one, bis(2,6-dimethoxybenzoyl)-2,4,4-trimethylpentylphosphine oxide p-dimethyl aminobenzoate, and combinations thereof. When exposed to UV radiation, the photopolymerization initiator cleaves into two free-radicals which begin the polymerization reaction.

In some embodiments, curing 525 (or 545) may be effected by chemical catalyst initiation. The chemical catalyst initiation may include the addition of a chemical initiator to the precursor material to effect curing 525 (or 545). Examples of chemical initiators are not limited by this disclosure, and may include any number or combination of chemical initiators now known or later developed. Illustrative examples of suitable chemical initators may include compounds having one or more peroxide (—O—O—) or azo (—N=N—) groups, such as benzoyl peroxide, t-butyl peroxide, hydrogen peroxide, azobisisobutyronitrile, and ammonium persulphate. The chemical catalyst initiation may further include the use of one or more thermosetting resins or resin compositions to effect curing 525 (or 545). Illustrative examples of thermosetting resins may include, but are not limited to, unsaturated polyester resins, polyester resins containing hydroxyl functional groups, phenolic resins, epoxy resins, high-performance epoxy resins, bismaleimides, modified bismaleimides such as epoxy modifications, biscyanate modifications, rubber-toughened bismaleimides, thermoplastic-toughened bismaleimides, and the like, acrylic resins, acrylic resins containing hydroxyl and/or carboxyl functional groups, fluorocarbon resins such as 2-part fluorocarbon modified urethane resin, silicon modified resins such as silicon modified acrylic clear, 2-part silicon modified urethane, and the like, amino resins such as aminoalkyl resin, melamine resins, isocyanate resins, blocked isocyanate resins, mixtures that include at least one of the foregoing thermosetting resins, and combinations that include at least one of the foregoing thermosetting resins. The thermosetting resin composition may be applied using any conventional method known to one skilled in the art.

As previously described herein, in some embodiments, the stamp may be inserted 530 in a bath of cladding material, applied 535 to the core material, and cured 545. These processes may be completed prior to application of the core material, subsequent to application of the core material, or at substantially the same time as the application of the core material.

In various embodiments, the source waveguide, the drain waveguide, and/or the micro-ring resonator may be integrated 550 with a microelectronic chip. The integration 550 is not limited by this disclosure, and can incorporate any number of methods and systems of integrating optical modulators with microelectronic chips that are now known or later developed. The integration 550 may be specific to applications for optical data processing and/or optical fiber communications. Illustrative types of optical data processing may include spectral filtering, channel selection, data re-routing, signal monitoring, switching, multiplexing (WDM), and/or the like.

EXAMPLES

Example 1

Micro-Ring Resonator

A micro-ring resonator having an internal radius of 250 μm is used in an optical modulator apparatus. The micro-ring resonator has a circular cross sectional shape formed from a stamp having a needle-like shape to form a circular cross-sectional bead. The micro-ring resonator is designed to work in a low coupling regime, having a coupling length of 100 μm between the micro-ring resonator and an input waveguide with a gap of 0.5 μm between the micro-ring resonator and the input waveguide. Similarly, a 100 μm coupling length and a 0.5 μm gap exists between the micro-ring resonator and the drain waveguide. A cladding and a core of each of the input waveguide, the drain waveguide, and the micro-ring resonator are made of polystyrene, with the cladding having a lower refractive index than the core.

Example 2

Method of Forming a Micro-Ring Resonator

A PDMS stamp that is formed in the shape of a triangle with concave sides similar to the stamp shown in FIG. 4 is used to form a waveguide having a semicircular cross sectional pattern. The PDMS stamp is placed in a bath of precursor material, the precursor material having a semiconductor portion made of silicon-germanium, a light outcoupling portion made of perfluorinated adamantane, a sol-gel material, polystyrene, active semiconductor nanoparticles having an average size of about 50 nm, and a thermal curing agent made of a polysulfide. Once the stamp is sufficiently coated in the precursor material, it is removed from the bath.

The stamp is applied to a silicon substrate, where an application tip of the stamp is pressed against the substrate at a 90 degree angle relative to the substrate so that the application tip and the substrate are perpendicular to one another. As the application tip is removed from the substrate, it forms a semicircular bead of precursor material on the substrate. The precursor material is then cured via a thermal curing process, and the resultant waveguide is optically attached to a source waveguide and a drain waveguide and integrated with an optical data switch.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of forming an optical apparatus, the method comprising:
    providing a substrate;
    applying a first precursor material to the substrate with a first micro-contact printing stamp, wherein the first micro-contact printing stamp is configured to apply the first precursor material in the form of a first micro-ring waveguide on the substrate;
    curing the first precursor material on the substrate to form the first micro-ring waveguide;
    providing a source waveguide in optical communication with the first micro-ring waveguide, wherein providing the source waveguide comprises coupling the source waveguide to the first micro-ring waveguide and configuring the source waveguide to carry an input signal to the first micro-ring waveguide; and providing a first drain waveguide in optical communication with the first micro-ring waveguide; wherein the drain wavequide comprises at least one branched drain wavequide configured to isolate a wavelength corresponding to the input signal.

2. The method of claim 1, wherein applying the first precursor material comprises applying one or more of:
a semiconductor material having at least one active portion that generates electromagnetic radiation; and
a light outcoupling substance.

3. The method of claim 1, wherein applying the first precursor material comprises applying one or more of a sol-gel material, a hydrocarbon polymer, a fluorinated polymer, and a silicon containing polymer.

4. The method of claim 1, wherein applying the first precursor material comprises selecting a micro-contact printing stamp with an internal radius in a range of about 5 μm to about 1000 μm.

5. The method of claim 1, wherein applying the first precursor material comprises selecting a micro-contact printing stamp having an internal radius based upon a wavelength to be isolated by the first micro-ring waveguide, wherein the wavelength is defined by $m\lambda=2\pi nR$, where m is the propagation mode number, n is the index of refraction of the first precursor material, and R is the internal radius of the first micro-ring waveguide.

6. The method of claim 1, wherein curing the first precursor material comprises curing by one or more of a thermal cure, a photoinitiation cure, and a chemical catalyst initiation cure.

7. The method of claim 1, wherein applying the first precursor material to the substrate with the first micro-contact printing stamp comprises applying with a micro-contact printing stamp comprising one or more silicone polymers or one or more elastomeric polymers.

8. The method of claim 1, further comprising integrating the optical apparatus with a microelectronic chip.

9. The method of claim 1, wherein applying the first precursor material to the substrate comprises applying to either a flexible substrate or a rigid substrate.

10. The method of claim 1, further comprising applying a second precursor material on to the first precursor material with a second micro-contact printing stamp.

11. The method of claim 10, wherein applying the second precursor material comprises applying a second precursor material having a lower refractive index than the first precursor material.

12. The method of claim 1, wherein applying the first precursor material to the substrate further comprises applying one or more of the source waveguide and the drain waveguide to the substrate with the first micro-contact printing stamp.

13. The method of claim 1, wherein providing the drain waveguide comprising coupling the drain waveguide to the first micro-ring waveguide and configuring the drain waveguide to carry an output signal from the first micro-ring waveguide.

14. The method of claim 1, wherein curing the first precursor material on the substrate to form the first micro-ring waveguide comprises curing the first precursor material to form a core of the first micro-ring waveguide.

15. The method of claim 14, further comprising:
applying a second precursor material to the core with a second micro-contact printing stamp; and
curing the second precursor material to form a cladding of the first micro-ring waveguide.

16. The method of claim 1, further comprising:
providing a second drain waveguide;
applying the first precursor material to the substrate with a third micro-contact printing stamp, wherein the third micro-contact printing stamp is configured to apply the first precursor material to the substrate in the form of a second micro-ring waveguide, wherein a radius of the second micro-ring waveguide is different from a radius of the first micro-ring waveguide;
curing the first precursor material to form the second micro-ring waveguide, wherein a characteristic frequency of the second micro-ring waveguide and the first micro-ring waveguide are different; and
optically coupling the source and second drain waveguides to the second micro-ring waveguide.

* * * * *

UNITED STATES PATENT AND TRADEMARK OFFICE
CERTIFICATE OF CORRECTION

PATENT NO. : 9,823,539 B2
APPLICATION NO. : 14/901676
DATED : November 21, 2017
INVENTOR(S) : Casasanta, III Page 1 of 1

It is certified that error appears in the above-identified patent and that said Letters Patent is hereby corrected as shown below:

In the Specification

In Column 5, Line 50, delete "a include" and insert -- may include --, therefor.

In Column 5, Line 58, delete "perfluorinated adamantine," and insert -- perfluorinated adamantane, --, therefor.

In Column 6, Lines 17-18, delete "tetrafluoroethylene Illustrative" and insert -- tetrafluoroethylene (TFE). Illustrative --, therefor.

In Column 6, Lines 44-45, delete "5 non," and insert -- 5 nm, --, therefor.

In Column 6, Line 56, delete "poly mercaptans," and insert -- polymercaptans, --, therefor.

In the Claims

In Column 15, Line 3, in Claim 1, delete "wavequide" and insert -- waveguide --, therefor.

In Column 15, Line 4, in Claim 1, delete "wavequide" and insert -- waveguide --, therefor.

Signed and Sealed this
Fourth Day of September, 2018

Andrei Iancu
*Director of the United States Patent and Trademark Office*